United States Patent [19]

Crockett

[11] Patent Number: 5,409,655

[45] Date of Patent: Apr. 25, 1995

[54] METHOD FOR FORMING A PRODUCT WITH A MOLDING MACHINE

[75] Inventor: Robert J. Crockett, Central, S.C.

[73] Assignee: NCR Corporation, Dayton, Ohio

[21] Appl. No.: 115,296

[22] Filed: Sep. 1, 1993

[51] Int. Cl.6 ...................... B29C 45/16; B29C 45/14; B29C 69/02

[52] U.S. Cl. .................................... 264/266; 264/504; 264/279

[58] Field of Search ............... 264/266, 259, 263, 265, 264/279, 267, 504

[56] References Cited

U.S. PATENT DOCUMENTS

| | | | |
|---|---|---|---|
| 4,824,627 | 4/1989 | Hammer | 264/211.21 |
| 4,979,636 | 12/1990 | Daly | 220/324 |
| 5,164,542 | 11/1992 | Hart | 174/35 MS |
| 5,182,032 | 1/1993 | Dickie et al. | 264/278 |
| 5,204,042 | 4/1993 | James et al. | 264/257 |

FOREIGN PATENT DOCUMENTS

| | | |
|---|---|---|
| 0249363 | 5/1987 | European Pat. Off. . |
| 972945 | 11/1959 | Germany . |
| 086724 | 7/1981 | Japan . |
| 179911 | 2/1986 | Japan . |

*Primary Examiner*—Jan H. Silbaugh
*Assistant Examiner*—Angela Ortiz
*Attorney, Agent, or Firm*—Paul J. Maginot

[57] ABSTRACT

A method for forming a product having a substrate and an overmold material secured thereto, with the substrate having a shape substantially as set forth in a predetermined design, and further with the product being formed in a molding machine that erodes portions of the substrate during a step of injecting the overmold material into a molding cavity of the molding machine. The method includes the step of providing the substantially design-shaped substrate having a compensation member secured thereto. The method further includes the step of placing the substantially design-shaped substrate having the compensation member secured thereto into the molding cavity so that the compensation member is positioned in a path of flow of the overmold material during the step of injecting the overmold material into the molding cavity. Moreover, the method includes the step of injecting the overmold material into the molding cavity so that the flow of the overmold material contacts and erodes the compensation member so as to form the product having the substantially design-shaped substrate and the overmold material secured thereto.

4 Claims, 8 Drawing Sheets

FIG. 1
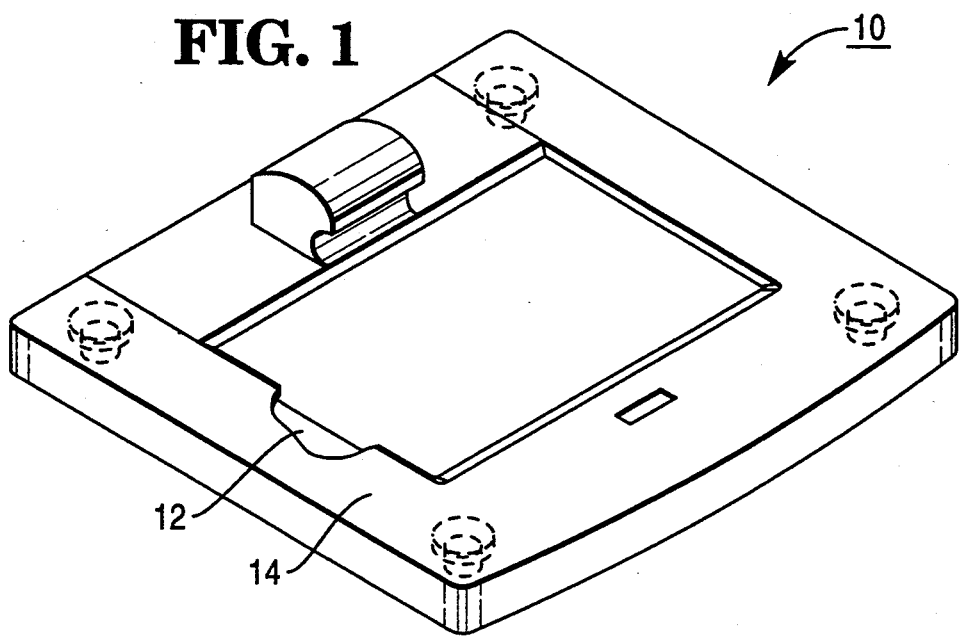
FINAL PRODUCT AS SET FORTH IN DESIGN
(E.G. BLUEPRINTS)
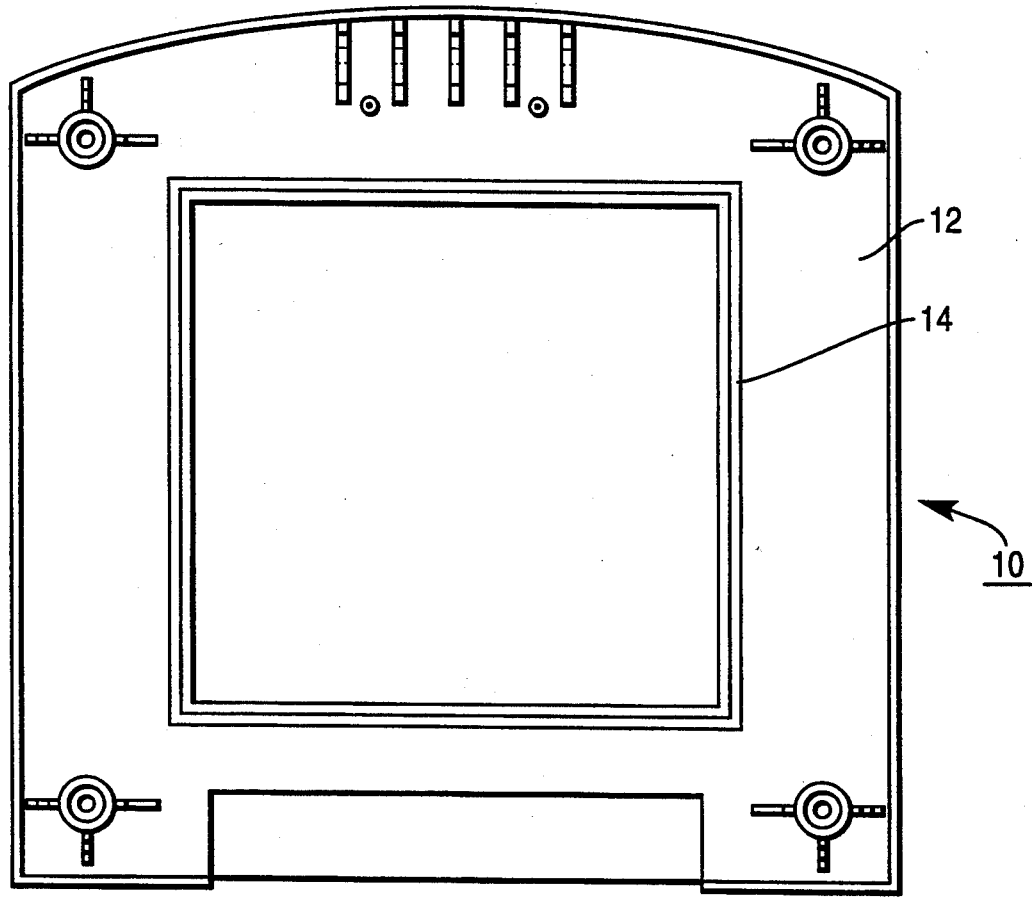
FIG. 2A

METHOD FOR FORMING A PRODUCT WITH A MOLDING MACHINE

BACKGROUND OF THE INVENTION

The present invention relates generally to an apparatus and method for forming a product with a molding machine, and more particularly relates to an apparatus and method for forming a product with a molding machine wherein the product includes a substrate and an overmold material secured thereto.

Molding machines are widely used for forming products. Some molding machines are adapted to form a product having a substrate and an overmold material secured thereto. For example, one molding machine which is able to form such a product is a high performance, high precision, injection molding machine, FS-SE series, sold by Nissei Plastic Industrial Co., Ltd. of Sakaki-machi, Nagano-ken, 389-06, Japan (United States corporate office in Fullerton, Calif. named "Nissei America, Inc."). The above molding machine includes a mold having a molding cavity. The substrate is first positioned in the molding cavity. Then, the overmold material is injected in a molten state into the molding cavity so as to form the product. The product is then allowed to cool and harden. Thereafter, the product is removed from the mold.

One problem which may arise when forming a product with a molding machine, such as the molding machine described above, is deterioration of the substrate due to the substrate being positioned in a path of flow of the molten overmold material during the step of injecting the overmold material into the molding cavity. During such overmold material injecting step, the flow of molten overmold material may contact a portion of the substrate material so as to undesirably erode the substrate.

It would be desirable to provide an apparatus and method for forming a product with a molding machine with the product including a substrate and an overmold material secured thereto, wherein the substrate was not negatively affected during the step of injecting the molten overmold material into the molding cavity of the molding machine. It would also be desirable to achieve the above goal in an inexpensive manner.

SUMMARY OF THE INVENTION

In accordance with one embodiment of the present invention, there is provided a method of forming a product having a substrate and an overmold material secured thereto, with the substrate having a shape substantially as set forth in a predetermined design, and further with the product being formed in a molding machine that erodes portions of the substrate during a step of injecting the overmold material into a molding cavity of the molding machine. The method includes the step of providing the substantially design-shaped substrate having a compensation member secured thereto. The method further includes the step of placing the substantially design-shaped substrate having the compensation member secured thereto into the molding cavity so that the compensation member is positioned in a path of flow of the overmold material during the step of injecting the overmold material into the molding cavity. The method additionally includes the step of injecting the overmold material into the molding cavity so that the flow of the overmold material contacts and erodes the compensation member so as to form the product having the substantially design-shaped substrate and the overmold material secured thereto.

Pursuant to another embodiment of the present invention, there is provided a member adapted to be used in a process of forming a product having a substrate and an overmold material secured thereto, with the substrate having a shape substantially as set forth in a predetermined design, and further with the product being formed in a molding machine that erodes portions of the substrate during a step of injecting the overmold material into a molding cavity of the molding machine. The member includes a substrate having the shape substantially as set forth in the predetermined design. The member further includes a compensator secured to the substrate and positioned in a path of flow of the overmold material during the step of injecting the overmold material into the molding cavity.

In accordance with yet another embodiment of the present invention, there is provided a method of forming a product having a substrate and an overmold material secured thereto, with the substrate having a shape substantially as set forth in a predetermined design, and further with the product being formed in a molding machine that erodes portions of the substrate during a step of injecting the overmold material into a molding cavity of the molding machine. The method includes the step of providing the substantially design-shaped substrate having a compensation member secured thereto. The method further includes the step of placing the substantially design-shaped substrate having the compensation member secured thereto into the molding cavity. The method additionally includes the step of injecting the overmold material into the molding cavity so that a flow of the overmold material contacts the compensation member so as to erode the compensation member and form the product having the substantially design-shaped substrate and the overmold material secured thereto.

It is therefore an object of the present invention to provide a new and useful method of forming a product with a molding machine.

It is a further object of the present invention to provide an improved method of forming a product with a molding machine.

It is another object of the present invention to provide a new and useful member adapted to be used in a process of forming a product with a molding machine.

It is still another object of the present invention to provide an improved member adapted to be used in a process of forming a product with a molding machine.

It is moreover an object of the present invention to provide a method for forming a product with a molding machine wherein the product includes a substrate and an overmold material secured thereto, wherein the substrate is not negatively affected during a step of injecting the overmold material into the molding cavity of the molding machine.

It is an additional object of the present invention to provide an inexpensive method for forming a product with a molding machine wherein the product includes a substrate and an overmold material secured thereto, wherein the substrate is not negatively affected during a step of injecting the overmold material into the molding cavity of the molding machine.

The above and other objects, features, and advantages of the present invention will become apparent from the following description and the attached drawings.

BRIEF DESCRIPTION OF THE DRAWINGS

FIG. 1 is a perspective view of the exterior side of a first computer housing portion which includes a first substrate and a first overmold material secured thereto;

FIG. 2A is a planar view of the interior side of the first computer housing portion of FIG. 1;

DETAILED DESCRIPTION OF THE PREFERRED EMBODIMENT

Figure 2B:
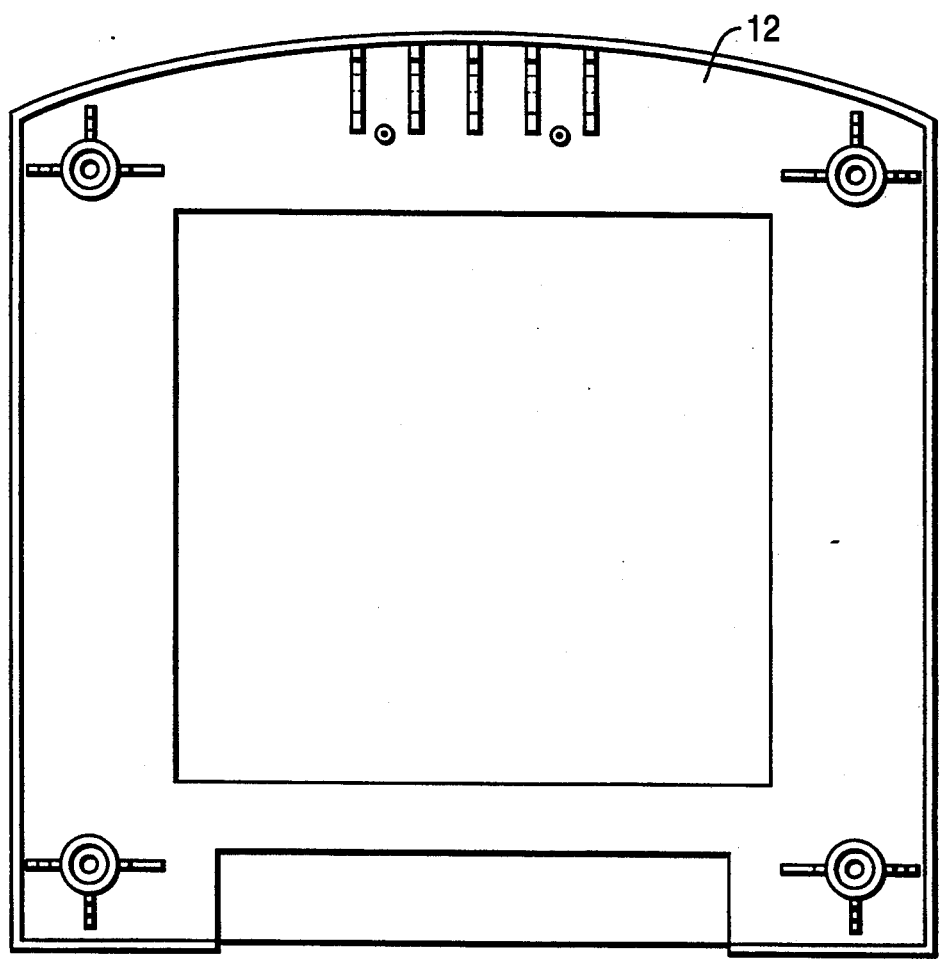
FIG. 2B is a planar view of the interior side of the first substrate of FIG. 1.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown an exterior side of a first computer housing portion, generally indicated by the reference numeral 10. The first computer housing portion 10 is an upper housing portion for a portable computer which may be used with a lower housing portion (not shown) to house electrical components of the portable computer therein.

Figure 3A:
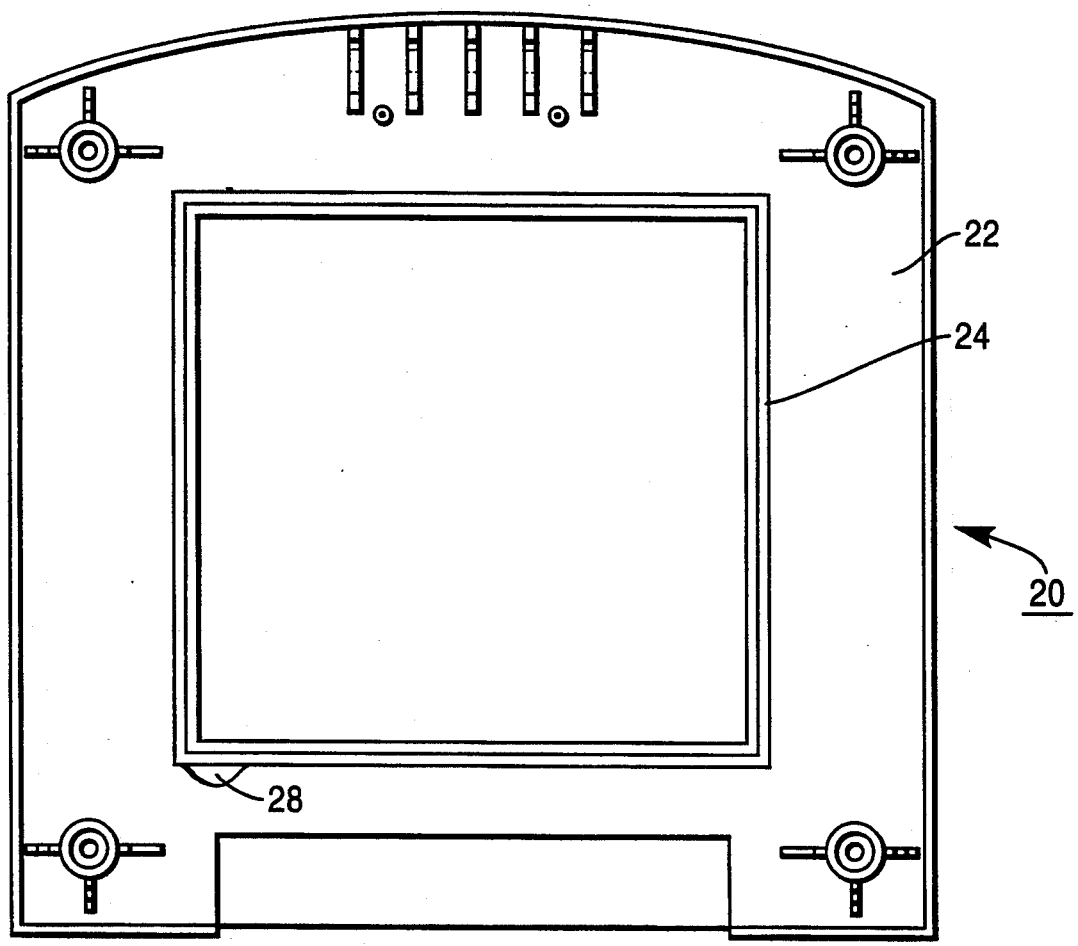
FIG. 3A is a planar view of the interior side of a second computer housing portion which includes a second substrate and a second overmold material secured thereto.
Figure 4A:
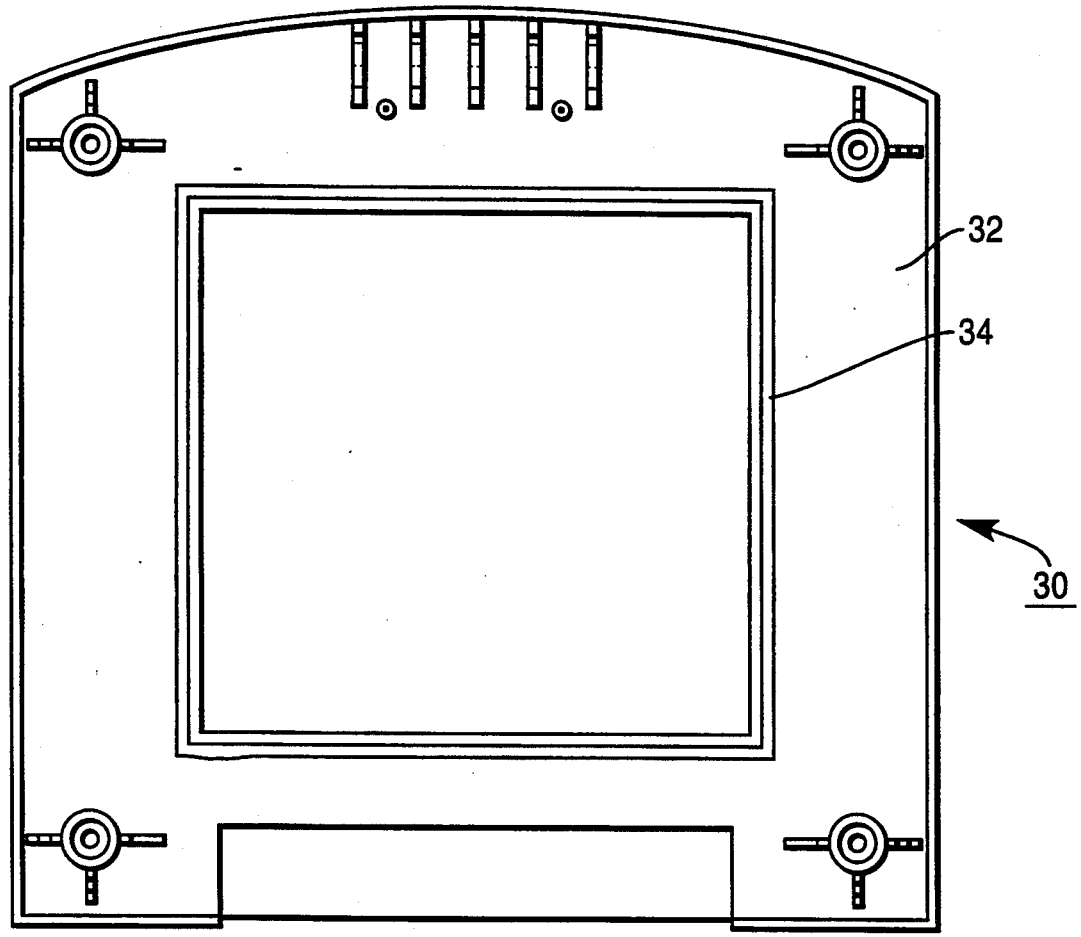
FIG. 4A is a planar view of the interior side of a third computer housing portion that incorporates various features of the present invention therein and which includes-a third substrate and a third overmold material secured thereto, with the third computer housing portion being formed by a method which incorporates various features of the present invention therein.

FIG. 2A shows an interior side of the first computer housing portion 10. The first computer housing portion 10 includes a first substrate 12 and a first overmold material 14 secured thereto (see also FIG. 1 ). FIG. 3A shows an interior side of a second computer housing portion, generally indicated by the reference numeral 20. The second computer housing portion 20 includes a second substrate 22 and a second overmold material 24 secured thereto. FIG. 4A shows an interior side of a third computer housing portion, generally indicated by the reference numeral 30. The third computer housing portion 30 includes a third substrate 32 and a third overmold material 34 secured thereto. The second housing portion 20 and the third housing portion 30 are both intended to be used as an upper housing portion in a manner similar to the first housing portion 10. By way of example, the first substrate 12, the second substrate 22 and the third substrate 32 each may be made from a modified nylon material such as Noryl, a trademark of General Electric Company of Fairfield, Conn. The first overmold material 14, the second overmold material 24 and the third overmold material 34 each may be made of a thermoplastic elastomer such as Krayton, a trademark of Shell Oil Company of Houston, Tex.

The first substrate 12 possesses a shape as set forth in a predetermined design or plan, or stated differently, the first substrate 12 is a design-shaped substrate, as will be further discussed hereinafter. FIG. 2B shows an interior side of the design-shaped substrate (i.e. first substrate 12). What is meant herein by the phrase "design-shaped substrate" or the phrase "the substrate possesses a shape as set forth in a predetermined design" is that the substrate has a shape exactly as intended in its design, for example, as set forth in a set of blue prints. As a result, the substrate 12, as shown in FIGS. 1, 2A and 2B, depicts the shape of the substrate 12 as planned in its design. However, an acceptable final product (i.e. the first computer housing portion 10) need not possess a substrate having a shape exactly the same as the shape of substrate 12 of FIG. 2B. Rather, an acceptable final product would include a substrate having a shape which deviates less than a predetermined amount (or tolerance) from the shape of the design-shaped substrate (i.e. within an allowable deviation from the standard shape).

In FIG. 3A, there is shown the second computer housing portion 20. The second computer housing portion 20 is formed in a molding machine (not shown). The molding machine includes a mold having a molding cavity as is well known to one skilled in the art. By way of example, one molding machine which may be used to form the second computer housing portion 20 is a high performance, high precision, injection molding machine, FS-SE series, sold by Nissei Plastic Industrial Co., Ltd. of Sakaki-machi, Nagano-ken, 389-06, Japan having a United States corporate office in Fullerton, Calif. named "Nissei America, Inc.". The second computer housing 20 is formed in the molding machine by, firstly, providing the second substrate 22 (which is substantially design-shaped at this point in time), secondly, placing the second substrate 22 into the molding cavity of the molding machine, and thirdly, injecting the overmold material 24 (in a molten state) into the molding cavity so as to form a product (i.e. the second computer housing portion 20). The product is then allowed to cool and harden. Thereafter, the product is removed from the mold.

Figure 3B:
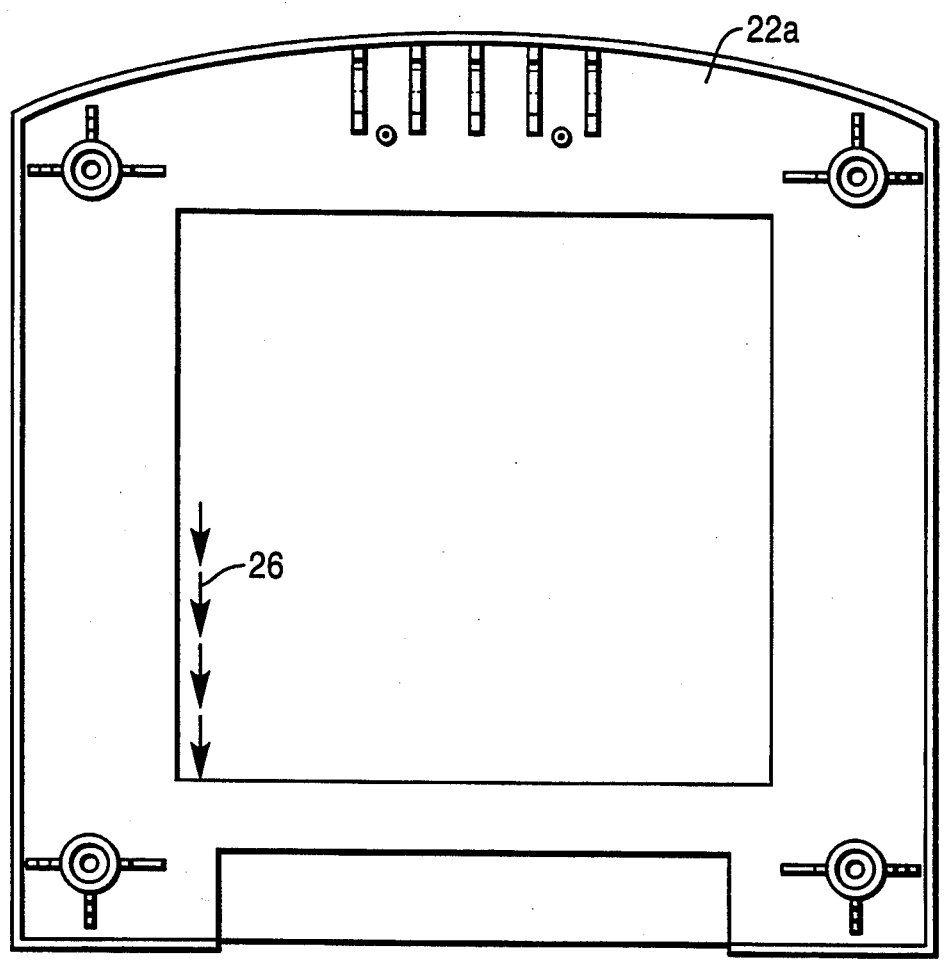
FIG. 3B is a planar view of the second substrate of FIG. 3A before a step of injecting the molten overmold material into the molding cavity of the molding machine.
Figure 3C:
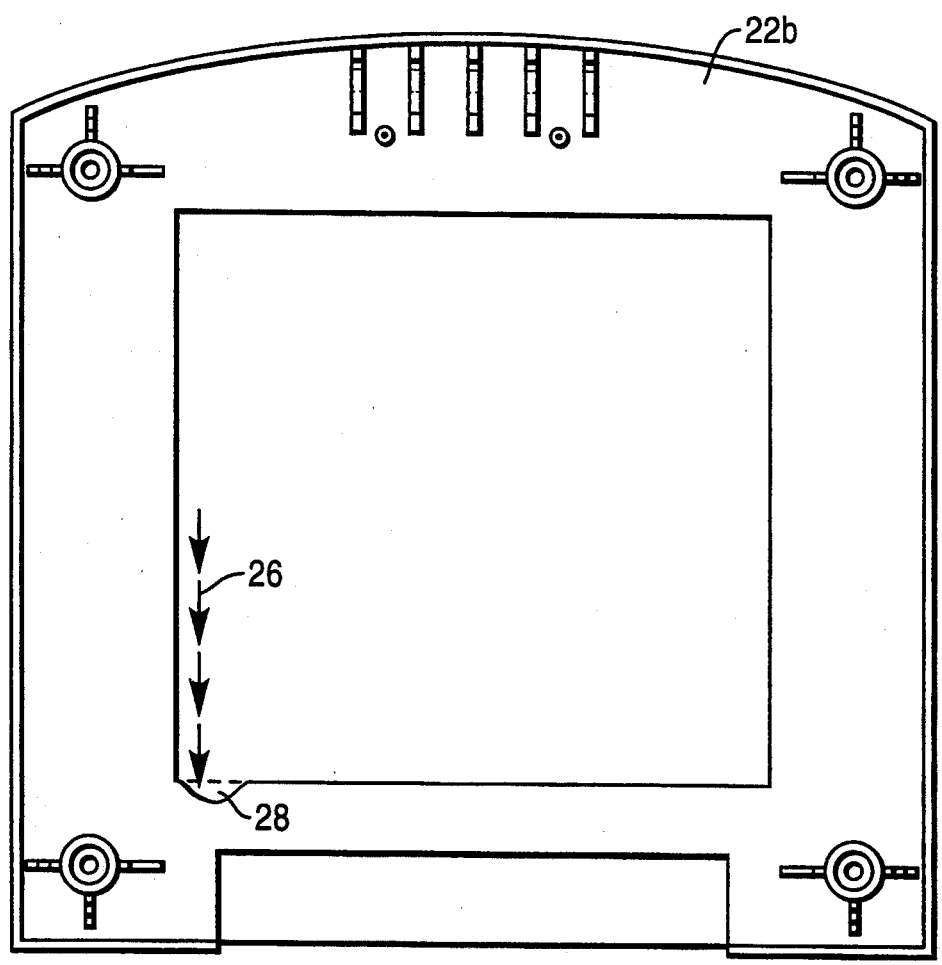
FIG. 3C is a planar view of the second substrate of FIG. 3A after the step of injecting the molten overmold material into the molding cavity of the molding machine.

The shape of substrate 22 is altered during the process of forming the second computer housing portion 20. When the second substrate 22 is placed into the molding cavity, the second substrate has a shape represented by the shape of a substrate 22a as shown in FIG. 3B. The substrate 22a is substantially design-shaped. However, during the process of forming the second computer housing portion 20 in the molding machine, the second substrate 22 changes its shape from the shape as shown by the substrate 22a in FIG. 3B to the shape as shown by a substrate 22b in FIG. 3C. This occurs as a result of the second substrate 22 being located within the molding cavity of the molding machine during the step of injecting the overmold material 24 (in a molten state) into the molding cavity of the molding machine since, during the injecting step, a flow of molten overmold material, as represented by arrows 26 in FIG. 3C, contacts and undesirably erodes a portion-of the substrate 22 so as to form an erosion area 28. The erosion area 28 is shown defined in the substrate 22b of FIG. 3C (see also the second computer housing portion 20 of FIG. 3A). Due to the erosion area 28, the second substrate 22 of the second housing portion 20 of FIG. 3A has a shape which deviates more than the predetermined amount from the shape of the design-shaped substrate (e.g. substrate 12). Therefore, the second substrate 22 of the second housing portion 20 is not substantially design-shaped and therefore would be unacceptable for use in a final product. Hence, the second computer housing portion 20 is a defective part.

Figure 4B:
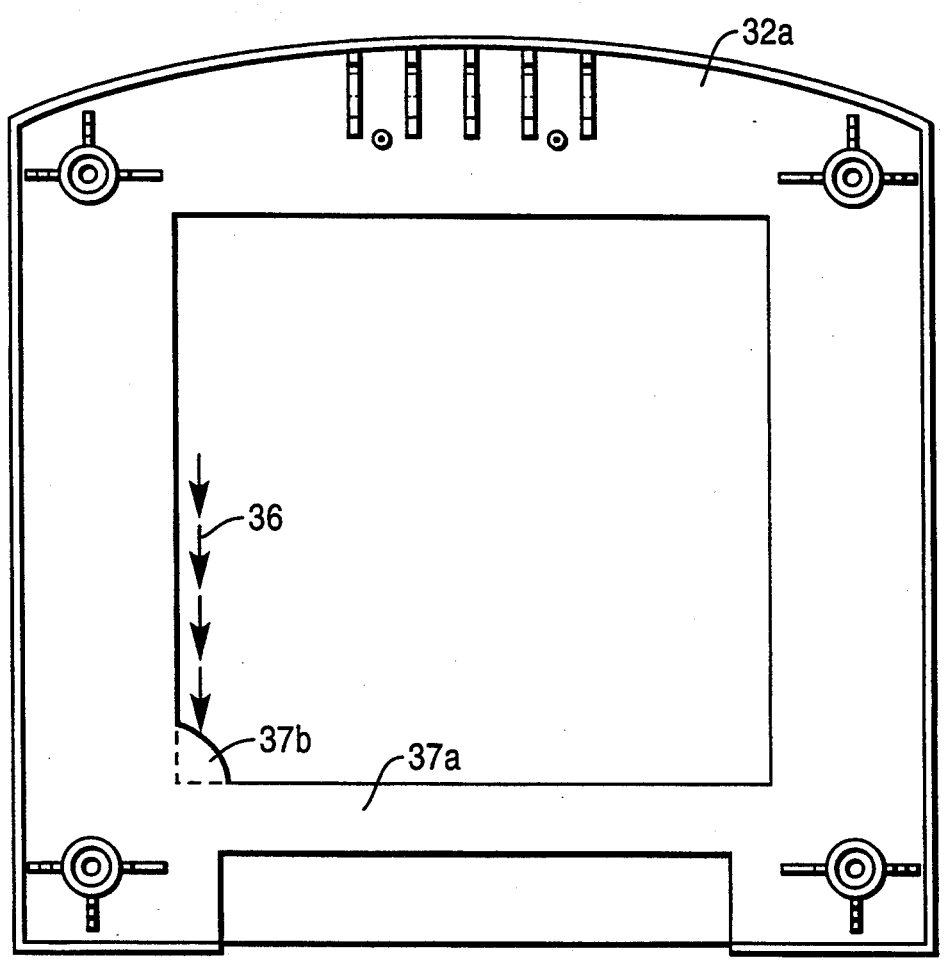
FIG. 4B is a planar view of the third substrate of FIG. 4A before a step of injecting the molten overmold material into the molding cavity of the molding machine, with a compensation member shown secured to the third substrate and located so as to be positioned in a path of flow of the molten overmold material during the injecting step.

In FIG. 4A, there is shown the third computer housing portion 30. As stated above, the third computer housing portion 30 includes the third substrate 32 and the third overmold material 34. The third computer housing portion 30 is also formed in the above-described molding machine. Prior to the process of forming the third computer housing portion 30, the third substrate 32 has a shape as represented by a substrate 32a as shown in FIG. 4B. The substrate 32a includes a substantially design-shaped substrate 37a and a compensation member or compensator 37b secured thereto (as shown in FIG. 4B). The substantially design-shaped substrate 37a and the compensation member 37b are integrally formed as one part. The phantom lines in FIG. 4B show the boundary between the substantially design-shaped substrate 37a and the compensation member 37b.

Figure 4C:
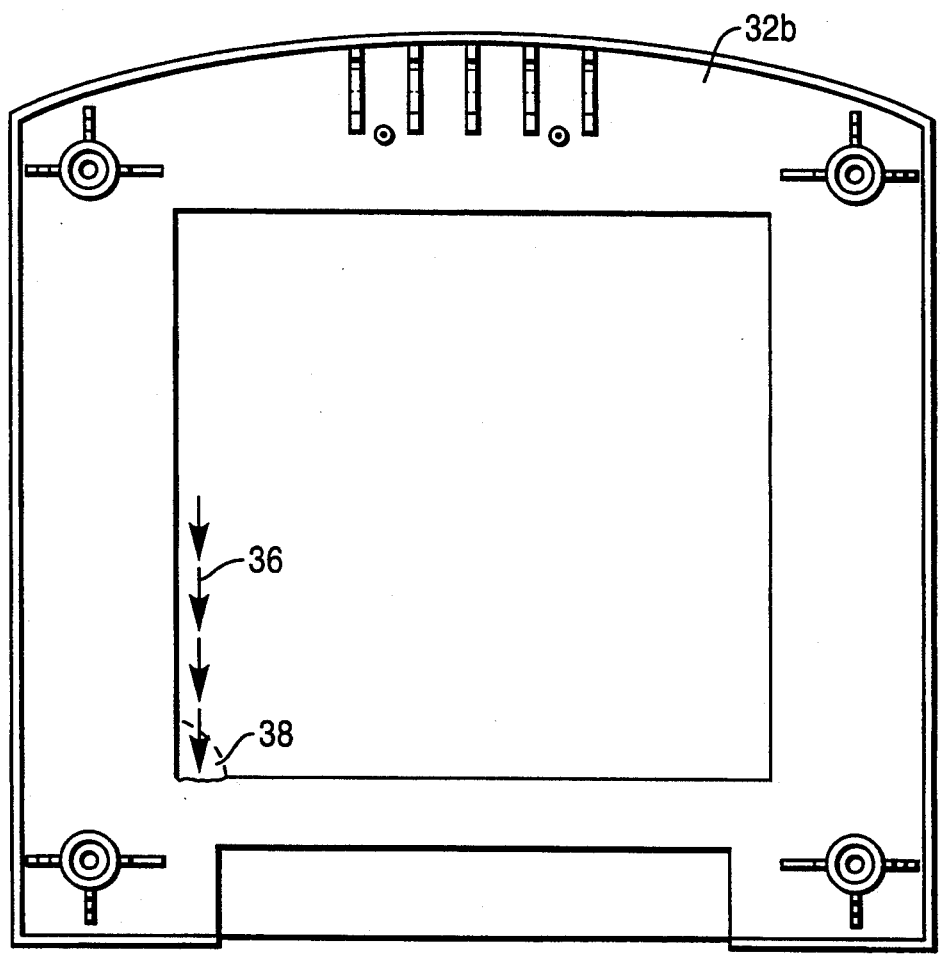
FIG. 4C is a planar view of the third substrate of FIG. 4A after the step of injecting the molten overmold material into the molding cavity of the molding machine, with the compensation member being substantially entirely eroded away and with the prior location of the compensation member being shown in phantom.

The third computer housing 30 is formed in the molding machine by, firstly, providing the third substrate 32 (which includes the substantially design-shaped substrate 37a and the compensation member 37b at this point in time), secondly, placing the third substrate 32 into the molding cavity of the molding machine, and thirdly, injecting the overmold material 34 (in a molten state) into the molding cavity so that a flow of the overmold material, as represented by arrows 36 in FIG. 4C, contacts the compensation member 37b so as to erode the compensation member and form a product (i.e. the third computer housing portion 30) having the substantially design-shaped substrate 37a and the overmold material 34 secured thereto. During the injecting step, the compensation member 37b is substantially entirely eroded so as to form an erosion area 38. The product is then allowed to cool and harden. Thereafter, the product is removed from the mold.

The shape of the third substrate 32 is altered during the process of forming the third computer housing portion 30. When the third substrate 32 is placed into the molding cavity, the third substrate has a shape represented by the shape of the substrate 32a as shown in FIG. 3B. The shape of substrate 32a includes the shape of substantially design-shaped substrate 37a and the shape of compensation member 37b. However, during the process of forming the third computer housing portion 30 in the molding machine, the third substrate 32 changes its shape from the shape as shown by substrate 32a in FIG. 4B to the shape as shown by substrate 32b in FIG. 4C. This occurs as a result of the substrate 32 being located within the molding cavity of the molding machine during the step of injecting the overmold material 34 (in a molten state) into the molding cavity of the molding machine since, during the injecting step, the flow of molten overmold material 36 contacts and desirably erodes away the compensation member 37b so as to form an erosion area 38. The erosion area 38 is substantially coincident with the prior location of the compensation member 37b. The erosion area 38 is shown in FIG. 4C. Due to the erosion of the compensation member 37b and the creation of the erosion area 38, the third substrate 32 of the third housing portion 30 of FIG. 4A has a shape which deviates less than the predetermined amount from the shape of the design-shaped substrate (e.g. substrate 12). As a result, the third substrate 32 is substantially design-shaped and therefore would be acceptable for use in a final product (i.e. third housing portion 30).

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A method of forming a product having a substrate and an overmold material secured thereto, with the substrate having a shape substantially as set forth in a predetermined design, and further with the product being formed in a molding machine that erodes portions of the substrate during a step of injecting the overmold material into a molding cavity of the molding machine, comprising the steps of:

providing the substantially design-shaped substrate having a compensation member secured thereto;

placing the substantially design-shaped substrate having the compensation member secured thereto into the molding cavity so that the compensation member is positioned in a path of flow of the overmold material during the step of injecting the overmold material into the molding cavity; and injecting the overmold material into the molding cavity so that the flow of the overmold material contacts and erodes the compensation member so as to form the product having the substantially design-shaped substrate and the overmold material secured thereto.

2. The method of claim 1, wherein the injecting step comprises the step of eroding away substantially all of the compensation member.

3. A method of forming a product having a substrate and an overmold material secured thereto, with the substrate having a shape substantially as set forth in a predetermined design, and further with the product being formed in a molding machine that erodes portions of the substrate during a step of injecting the overmold material into a molding cavity of the molding machine, comprising the steps of:

providing the substantially design-shaped substrate having a compensation member secured thereto;

placing the substantially design-shaped substrate having the compensation member secured thereto into the molding cavity; and injecting the overmold material into the molding cavity so that a flow of the overmold material contacts the compensation member so as to erode the compensation member and form the product having the substantially design-shaped substrate and the overmold material secured thereto.

4. The method of claim 3, wherein the injecting step comprises the step of eroding away substantially all of the compensation member.

* * * * *